United States Patent [19]

Breton et al.

[11] Patent Number: 5,211,747
[45] Date of Patent: May 18, 1993

[54] INK JET INK COMPOSITIONS CONTAINING DESIZING AGENTS

[75] Inventors: Marcel P. Breton; Shadi L. Malhotra, both of Mississauga, Canada; Toshitake Yui, Minamiashigara, Japan; Kerstin M. Henseleit, Toronto; Melvin D. Croucher, Oakville, both of Canada

[73] Assignee: Xerox Corporation, Stamford, Conn.

[21] Appl. No.: 700,967

[22] Filed: May 16, 1991

[51] Int. Cl.$^5$ .................................................. C09D 11/02
[52] U.S. Cl. ................................. 106/20 R; 106/22 R; 106/27 R
[58] Field of Search .................... 106/20, 22, 27, 20 R, 106/22 R, 27 R

[56] References Cited

U.S. PATENT DOCUMENTS

| | | | |
|---|---|---|---|
| 4,072,462 | 2/1978 | Vellins et al. | 106/22 |
| 4,074,034 | 2/1978 | Soga et al. | 525/386 |
| 4,150,997 | 4/1979 | Hayes | 106/20 |
| 4,154,618 | 5/1979 | Burke | 106/27 |
| 4,163,001 | 7/1979 | Carumpalos et al. | 106/20 |
| 4,281,329 | 7/1981 | Yano et al. | 106/22 |
| 4,352,691 | 10/1982 | Owatari et al. | 106/20 |
| 4,378,564 | 3/1983 | Cross et al. | 106/20 |
| 4,508,570 | 4/1985 | Fujii et al. | 106/20 |
| 4,530,961 | 7/1985 | Nguyen et al. | 106/20 |
| 4,659,382 | 4/1987 | Kang | 106/22 |
| 4,740,549 | 4/1988 | Okuzono et al. | 106/20 |
| 4,761,180 | 8/1988 | Askeland et al. | 106/20 |
| 4,789,400 | 12/1988 | Solodar et al. | 106/20 |
| 4,836,852 | 6/1989 | Knirsch et al. | 106/22 |
| 4,838,938 | 6/1989 | Tomida et al. | 106/20 |
| 4,847,316 | 7/1989 | Schick et al. | 524/88 |
| 4,853,036 | 8/1989 | Koike et al. | 106/20 |
| 4,889,877 | 12/1989 | Seitz | 106/20 |
| 4,923,515 | 5/1990 | Koike et al. | 106/20 |
| 5,019,166 | 5/1991 | Schwarz | 106/20 |
| 5,067,980 | 11/1991 | Koike et al. | 106/20 |
| 5,092,907 | 3/1992 | Riblet et al. | 106/22 |
| 5,124,718 | 6/1992 | Koike et al. | 106/22 |

FOREIGN PATENT DOCUMENTS 2199041 6/1988 United Kingdom .

OTHER PUBLICATIONS

C. A. Bruce, "Dependence of Ink Jet Dynamics on Fluid Characteristics" IBM J. Res. Develop., pp. 258-270, May, 1976.
B. L. Beach et al, "Materials Selection for an Ink Jet Printer," Ink Jet Printer Materials, pp. 75-80, Jan., 1977.
C. T. Ashley, "Development and Characterization of Ink for an Electrostatic Ink Jet Printer", Jet Printer Ink, pp. 69-74, Jan., 1977.
A. Naka et al, "Ability of Surfactants to Form Highly Loaded Coal-Water Mixtures" JAOCS, vol. 65, No. 7 (Jul. 1988), pp. 1194-1201.
"The Jeffamine Polyoxyalkyleneamines"— Texaco Chemical Company, 1987.
M. Ozaki et al, "Fixing Time of Ink-Jet Inks on Plain Paper" SPIE vol. 1079 Hard Copy Output (1989), pp. 384-388.
Alkateric— Amphoterics, pp. 18-19.
Rexol 130— Technical Bulletin TM-86-008, pp. 1-4.

Primary Examiner—Mark L. Bell
Assistant Examiner—Helene Klemanski
Attorney, Agent, or Firm—Oliff & Berridge

[57] ABSTRACT

An ink composition having a pH of about 5 to about 10 contains a colorant, a liquid carrier and less than about 5 wt. % of a desizing agent. The desizing agent may be (1) poly(oxyalkylene) modified compounds of sorbitan esters, fatty amines, alkanol amides, castor oil, fatty acid, fatty alcohol; (2) hydrophilic poly(dialkyl-siloxanes); (3) fatty imidazolines; (4) fatty ester modified compounds of phosphate, sorbitan, glycerol, poly(ethylene glycol), sulfosuccinic acid, sulfonic acid, alkyl amine; (5) quaternary alkosulfate compounds; (6) poly(propylene oxide)—poly(ethylene oxide) copolymers; (7) poly(alkylene glycol); or (8) mixtures thereof.

31 Claims, No Drawings

INK JET INK COMPOSITIONS CONTAINING DESIZING AGENTS

BACKGROUND OF THE INVENTION

1. Field of the Invention

This invention relates to ink jet printing, and more particularly, to ink compositions for ink jet printers.

2. Description of the Related Art

Ink compositions, especially those for use with ink jet printers, must satisfy a number of conditions in order to achieve acceptable printing. Generally, it is desirable to provide good print quality. A fast drying ink composition is also desirable. However, fast drying inks tend to suffer from poor print quality due to feathering, intercolor bleeding, and the like.

The print quality of an ink may also be affected by the printing medium used. For example, paper is often sized with sizing components for the purpose of retarding or preventing penetration of liquids into the structure. This is commonly done by introducing a material to the pulp during the paper making operation. Paper may be sized internally or on the surface. Acid sizing chemicals, such as Mon size available from Monsanto Chemical Company or alkaline sizing chemicals such as Hercon-76 available from Hercules Company, are precipitated onto the fibers primarily for the purpose of controlling penetration of liquids into the final dry paper. This process is known as internal sizing. Surface sizing involves the application of dispersions of film-forming substances such as converted starches, gums and modified polymers to previously formed paper. Surface sizing imparts strength to the paper and thus high quality printing papers are often surface sized as well. These internally and surface sized papers, when used with an ink jet printer containing predominantly water based inks, yield images which have undesirable pronounced intercolor bleed. The extent of intercolor bleed is reduced slightly with papers which are internally sized with no surface sizing.

It has been attempted to make the pH of the ink strongly basic or to add a large amount of a surfactant to the ink. An ink which is strongly alkaline is dangerous when the ink is touched, and also involves the drawbacks that it does not fair well with respect to feathering and drying characteristics for papers in which certain kinds of sizing agents are employed. On the other hand, a large amount of surfactant may lead to adverse effects as well, such as feathering, poor ejectability from ink jet nozzles, and the like.

U.S. Pat. No. 4,352,691 to Owatari et al. discloses a liquid ink for printers comprising a chemical component which dissolves at least one of a fibrous material, sizing material, and a surface treatment material. The component is a strong basic material which permits the ink to penetrate through a paper and dry rapidly upon impact. The strong basic material is a strong alkali such as sodium or potassium hydroxide, which may react with a wetting agent such as glycerin to form an alkoxide. The pH of the ink is between about 10 and 14.

U.S. Pat. No. 4,932,515 to Koike et al. discloses a recording liquid composition comprising water, a water-soluble dye, and an organic solvent. The organic solvent can sufficiently dissolve the dye and rapidly precipitate the dye by evaporation of the water in the ink so that high quality printing on a paper with a high or low degree of sizing can be accomplished. The water soluble dye has a solubility of 5% by weight or less in the organic solvent. The organic solvent may include polyalkylene glycols, block copolymers of ethylene oxide and propylene oxide, and others, present in an amount from 2 to 70% by weight, preferably 5 to 65% by weight, and more preferably 10 to 60% by weight.

Ozaki et al, Fixing Time of Ink-Jet Inks on Plain Paper, SPIE Vol. 1079 Hard Copy Output (1989), pp. 384–388, discloses the use of glycols to dissolve sizing agents such as resins in order to improve drying times on plain paper, especially papers containing resin. The inks have a viscosity greater than 4cP and drying times greater than a few seconds. The amount of glycol is greater than 5 wt. %.

There remains a need for ink compositions that are useful in ink jet printing processes, including color printing processes.

SUMMARY OF THE INVENTION

It is an object of the invention to provide an improved ink composition, especially for ink jet printers, which overcomes the disadvantages of the prior art.

It is also an object of the invention to decrease the drying times of inks.

It is a further object of the invention to provide an ink composition having improved print qualities.

It is another object of the invention to eliminate or minimize intercolor bleeding.

It is still another object of the invention to minimize feathering.

These and other objects of the invention are accomplished by the ink compositions of the present invention. More specifically, the ink compositions of the present invention are provided with a water or alcohol-soluble desizing agent which allows the ink to penetrate the paper and dry in a manner which produces good print quality. The ink compositions of the present invention may comprise a colorant, an ink vehicle, and less than about 5% of the desizing agent.

DETAILED DESCRIPTION OF PREFERRED EMBODIMENTS

The present invention provides ink compositions having improved printing properties such as reduced drying times, minimized intercolor bleeding, minimized feathering, and the like. The ink compositions of the present invention contain a desizing agent. The desizing agent reduces, avoids, or minimizes the effects of sizing agents present in paper. Generally, the ink compositions of the present invention also comprise an ink vehicle such as water or a mixture comprising water and a water soluble or water miscible organic solvent and a colorant soluble therein.

In a preferred liquid ink composition in accordance with the present invention, the ink contains no more than about 5 wt. % of the desizing agent, preferably less than about 2 wt. % and more preferably less than about 1 wt. % of the desizing agent, about 1 wt. % to about 8 wt. % of the colorant, and about 85 wt. % to about 95 wt. % of the ink vehicle. With greater amounts of the desizing agent, better penetrating effects into paper are seen. However, jetting properties tend to become poor with greater amounts of the desizing agent.

The amount of the desizing agent used in the present invention permits low sizing values on paper to be obtained. Low sizing values permit efficient penetration into paper to achieve fast drying times. Hercules sizing values on diazo paper of less than about 6 are preferred, with sizing values between about 0.5 and about 6 being more preferred, and between about 3 and about 6 being most preferred. Ink compositions having high sizing values will not desize paper fast enough to obtain good drying times, while very low desizing values may cause wetting of the front face of a printhead and instable jetting.

The ink compositions of the present invention have a pH between about 5 and about 10, and more preferably between about 6 and about 9. The pH avoids deterioration of materials in the channels of ink jet printers. Since the desizing agents of the present invention are effective when added in amounts less than about 5% by weight, they have a very slight effect on the pH of the composition. The surface tension of the ink compositions of the invention preferably ranges between about 30 and about 40 dynes/cm.

It is preferred that the desizing agent is water or alcohol soluble. The desizing agent may be selected from the group consisting of (1) poly(oxyalkylene) modified compounds of sorbitan esters, fatty amines, alkanol amides, castor oil, fatty acid, fatty alcohol; (2) hydrophilic poly(dialkyl-siloxanes); (3) fatty imidazolines; (4) fatty ester modified compounds of phosphate, sorbitan, glycerol, poly(ethylene-glycol), sulfosuccinic acid, sulfonic acid, or alkyl amine; (5) quaternary alkosulfate compounds; (6) poly(propylene oxide)-poly(ethylene-oxide) copolymers; (7) poly(alkylene-glycol); and (8) mixtures thereof.

Specific examples of water or alcohol soluble desizing agents that can be selected for use in the ink composition of the present invention include, for example, (1poly(oxyalkylene) polymers such as poly(propylene oxide)-b-poly(ethylene oxide)-b-poly(propylene oxide) triblock copolymers and poly(ethylene oxide)-b-poly(-propylene oxide)-b-poly(ethylene oxide) triblock copolymers and tetrafunctional block copolymers derived from the sequential addition of ethylene oxide and propylene oxide to ethylene diamine, and poly(oxyalkylene) modifications of (a) sorbitan esters (e.g., Alkamuls PSML-4 (poly(oxyethylene) sorbitan monolaurate), Alkamuls PSMO-20 (poly(oxyethylene) sorbitan monooleate), Alkamuls PSTO-20 (poly(oxyethylene) sorbitan trioleate), Alkaril Chemicals); (b) fatty amines (e.g., Alkaminox T-2, T-5 (tallow amine ethoxylate), Alkaminox SO-5 (soya amine ethoxylate), Alkaril Chemicals), (Icomeen T-2, Icomeen T-15, ICI Chemicals); (c) castor oil (e.g., Alkasurf CO-10, Alkasurf CO-25B (castor oil ethoxylates), Alkaril Chemicals); (d) alkanol amide (e.g., Alkamide C-2, C-5 (coconut oil alkanolamide ethoxylates), Alkaril Chemicals); (e) fatty acid (e.g., Alkasurf 075-9, Alkasurf 0-10, Alkasurf 0-14 (oleic acid ethoxylates), Alkasurf L-14 (lauric acid ethoxylate), Alkasurf P-7 (palmitic acid ethoxylate), Alkaril Chemicals); (f) fatty alcohol (e.g., Alkasurf LAN-1, LAN-3 Alkasurf TDA-6, Alkasurf SA-2, (linear alcohol ethoxylates), Alkasurf NP-1, NP-11, Rexol 130 (nonyl phenol ethoxylates), Alkasurf OP-1, OP-12 (octyl phenol ethoxylates), Alkasurf LA-EP-15, Alkasurf LA-EP-25, Alkasurf LA-EP-65 (linear alcohol alkoxylates)); (2) hydrophilic poly(dimethyl siloxanes) such as (a) poly(-dimethyl siloxane) monocarbinol terminated (PS558, Petrarch Systems Inc.) and dicarbinol terminated (PS555, PS556, Petrarch Systems Inc.); (b) poly(-dimethyl siloxane)-b-poly(methyl siloxane alkylene oxide) copolymers (PS 073, PS 072, PS 071, Petrarch Systems Inc.), Alkasil HEP 182-280, Alkasil HEp 148-330 (Alkaril Chemicals), non-hydrolyzable copolymers containing Si-C linkages; poly(dimethyl siloxane)-b-(methyl siloxane alkylene oxide) diblock copolymers where alkylene is ethylene, propylene or ethylenepropylene; (c) poly(dimethyl siloxane)-b-poly(propylene oxide)-b-poly(ethylene oxide) copolymers (Alkasil NEP 73-70, Alkaril Chemicals), hydrolyzable copolymer containing Si—O—C linkages; (d) poly quaternary poly(dimethyl siloxane) copolymers (which can be obtained by the addition reaction of $\alpha,\omega$-hydrogen polysiloxane with epoxides containing olefinic bonds and then reacting the product with a diamine) poly(ethylene oxide)-b-poly(dimethyl siloxane) diblock copolymers and oly(ethylene oxide)-b-poly(dimethyl siloxane)-b-poly(ethylene oxide) triblock copolymers; (3) fatty imidazolines and their derivatives such as (a) Alkazine-0 (oleic derivative); (b) Alkazine TO (tail oil derivatives); (c) Alkateric 2C1B (dicarboxylic cocoimidazoline sodium salt), Alkaril Chemicals; (d) Arzoline-4; (e) Arzoline - 215, Baker Chemicals (f) coco hydroxyethyl imidazoline, (g) oleic hydroxyethyl imidazoline, (h) tall oil amino ethyl imidazoline and (i) sodium carboxylic imidazoline; (4) fatty ester modifications of (a) phosphates (e.g., Alkaphos B6-56A, Alkaril Chemicals) including mono and diesters of phosphates, (b) sorbitan (e.g., Alkamuls STO (sorbitan trioleate) Alkamuls SML (sorbitan mono laurate), Alkamuls SMO (sorbitan monooleate), Alkaril Chemicals); (c) glycerols (e.g., Alkamuls GMO 45LG (glyceryl mono oleate), Alkamuls GDO (glyceryl dioleate), Alkamuls GTO (glyceryl trioleate); (d) poly(ethylene glycols) (Alkamuls 600 DO (di oleate), Alkamuls 400-ML (mono laurate), Alkamuls 600 MO (mono oleate), Alkamuls 600 DL (dilaurate), Alkamuls 600 DT (ditallow), Alkaril Chemicals); (e) sulfosuccinic acid (e.g., Alkasurf SS-O-75 (sodium dioctyl sulfosuccinate), Alkasurf SS-DA4-HE (ethoxylated alcohol sulfosuccinate), Alkasurf SS-L7DE (sodium sulfosuccinate ester of lauric diethanol amide), Alkasurf SS-L-HE (sodium lauryl sulfosuccinate), Alkaril Chemicals); (f) sulfonic acid (e.g, Alkasurf CA, (calcium dodecyl benzene sulfonate), Alkasurf IPAM (isopropylamine dodecyl benzene sulfonate), Alkaril Chemicals); (g) alkyl amines (e.g., Alkamide SDO (soya diethanol amide), Alkamide CDE (coco diethanol amide), Alkamide 2104 (diethanol amide of coconut fatty acid), Alkamide CMA (coco monoethanol amide), Alkamide L9DE (lauric diethanol amide), Alkamide L7Me (lauric monoethanol amide), Alkamide LIPA (lauric monoisopropylamide), Alkaril Chemicals); (5) quaternary compounds such as (a) nonpolymeric quaternary ammonium ethosulfate (e.g., Finquat CT, Cordex AT-172, Finetex Corporation); (b) quaternary dialkyl dimethyl methosulfate (e.g., Alkaquat DHTS (hydrogenated tallow)); (c) alkoxylated difatty methosulfate quaternary (e.g., Alkasurf DAET (tallow derivative)) and quaternized compounds such as quaternized oleic imidazoline methosulfate, (d) fatty imidazoline methosulfate quaternary (e.g., Alkaquat T (tallow derivatives), Alkaril Chemicals); (6) water soluble copolymers of lipophilic poly(-propylene oxide) with hydrophilic poly(ethylene oxide) such as (a) methanol soluble—Tetronic 150R1, Pluronic L-101, Tetronic 902, Tetronic 25R2 (BASF Corporation), Alkatronic EGE-1 (Alkaril Chemicals); (b) water soluble—Tetronic 908, 50R8, 25R8, 904, 90R4, Pluronic F-77 all from BASF Corporation, and Alkatronic EGE 25-2 and PGP 33-8 from Alkaril Chemicals; (7) poly-(alkylene glycol) and its derivatives such as (a) poly(-propylene glycol) (Alkapol PPG 425, Alkapol PPG-4000, Alkaril Chemicals); (b) poly(propylene glycol dimethacrylate), poly(ethylene glycol diacrylate), poly(ethylene glycol dimethacrylate), poly(ethylene glycol monomethyl ether), poly(ethylene glycol dimethyl ether), poly(ethylene glycol diglycidyl ether) (all from Polysciences); (c) poly(1,4-oxybutylene glycol) (Scientific Polymer Products); and the like.

Examples of specific preferred desizing agents of the invention include linear alcohol ethoxylates (e.g., Alkasurf LA-EP-65, LA-EP-25 and LA-EP-15 available from Alkaril Chemicals), nonyl phenol ethoxylates (e.g., Alkasurf NP-11 available from Alkaril Chemicals and Rexol 130 available from Hart Chemicals), octyl phenol ethoxylates (e.g., Alkasurf OP-12 available from Alkaril Chemicals), oleic acid ethoxylates (e.g., Alkasurf O-14 available from Alkaril Chemicals), poly(-dimethyl siloxane)-b-poly (propylene oxide)-b-poly(ethylene oxide) copolymers (e.g., Alkasil NEP 73-70 available from Alkaril Chemicals), castor oil ethoxylates (e.g., Alkasurf CO-25B available from Alkaril Chemicals), dicarboxylic cocoimidazoline sodium salts (e.g., Alkateric 2CIB available from Alkaril Chemicals), and diethanol amide of coconut fatty acid (e.g., Alkamide S104 available from Alkaril Chemicals). The Alkasurf desizing agents advantageously are biodegradable.

The nonyl phenol ethoxylate surfactant of the invention is a non-ionic surfactant which decreases the drying time of ink on plain paper without significantly altering the jetting characteristics of the printer or the image quality of the resulting image. Preferably, the nonyl phenol ethoxylate surfactant of the invention is present in the ink composition in an amount ranging from about 0.1 to about 4% by weight, and more preferably in an amount ranging from about 0.5 to about 2% by weight, based on weight of the total composition.

Inks containing the nonyl phenol ethoxylate surfactant preferably have a viscosity between about 2 to about 3 cP in order to achieve acceptable jetting characteristics.

The ink vehicle of the invention is the major component of the composition. Any of a number of various ink vehicles may be employed. Generally, however, the ink vehicle contains water, more preferably deionized water, as the primary component. The ink vehicle may also contain cosolvents and/or additives which modify the properties of the ink composition such as, for example, to adjust viscosity, surface tension, drying time, etc. The cosolvent may be a water miscible organic solvent. Suitable water miscible organic solvents include ethylene glycol, propylene glycol, diethylene glycols, glycerine, dipropylene glycols, polyethylene glycols, polypropylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof.

When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). Heterophase ink jet inks are also known.

The colorant may be any material which permits the development of visible images on a recording medium such as paper. The colorant may include dyes and/or pigments and the like. The colorant is preferably a dye. Generally, any effective dye, such as one of the direct dyes or the acid dyes, can be selected as the colorant, provided that it is compatible with the other ink components and is soluble in the ink vehicle. Examples of suitable dyes include anthraquinones, monoazo dyes, disazo dyes, phthalocyanines, aza(18)annulenes, and formazan copper complexes. Particular dyes which may be used in the ink compositions of the invention include, for example, Food Black #2, Direct Black 168, Direct Blue 199, Acid Blue 9, Acid Red 249, Reactive Black 31, Direct Black 154, Reactive Red 180, Direct Blue 86, Acid Yellow 23, and the like.

As discussed above, the ink compositions of the present invention may also include additives in addition to the colorant, ink vehicle and the desizing agent. Polymeric additives can also be added to inks to enhance their viscosity. Such additives include water soluble polymers such as gum arabic, polyacrylate salts, polymethacrylate salts, polyvinyl alcohols, hydroxy propylcellulose, hydroxyethylcellulose, polyvinyl-pyrrolidinone, polyvinylether, starch, polysaccharides, and the like. Polymeric additives may be present in inks in amounts of from 0 to about 5 percent by weight, and preferably from about 0.01 to about 2.5 percent by weight.

Other optional additives to inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, humectants and penetration control additives such as ethylene glycol, diethyleneglycol, N-methylpyrrolidinone, propylene glycol, hydroxyethers, ethers, amides, sulfoxides, ketones, lactones, esters, alcohols, butyl carbitol, benzyl alcohol, isopropanol, cyclohexylpyrrolidinone, 1,2-hexanediol, and the like, present in an amount of from 0 to about 50 percent by weight, and preferably from about 5 to about 40 percent by weight; pH controlling agents such as acids or bases, phosphate salts, carboxylate salts, sulfite salts, amine salts and the like, present in an amount of from 0 to about 1 percent by weight and preferably from about 0.01 to about 1 percent by weight, or the like. Surface active agents such as the polyalkyleneimine/alkylene oxide block copolymers and the primary or secondary polyoxyalkylene amines disclosed in simultaneously filed U.S. Ser. No. 07/701,242 may also be added.

Inks can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. Any other suitable processes for preparing inks can also be employed.

The ink compositions of the invention preferably can be used in ink jet printing systems. Such inks are preferably capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle.

The invention will be further illustrated in the following, non-limiting Examples, it being understood that these Examples are intended to be illustrative only and that the invention is not intended to be limited to materials, conditions, process parameters, and the like recited herein.

COMPARATIVE EXAMPLES 1 AND 2

An ink formulation is prepared containing 3 wt. % Food Black #2, 10 wt. % propylene carbonate, and 87% deionized water. In Example 1, the ink is applied to diazo paper. In Example 2, the ink is applied to Xerox 4024 ® paper and Sanyo L ® paper.

EXAMPLES 3–12

Ink compositions are prepared containing the formulation as set forth in Example 2, except that 1 wt. % of the deionized water is replaced with wt. % of a desizing agent.

EXAMPLE 13

An ink composition is prepared containing 3 wt. % Food Black #2, 5.25 wt. % diethylene glycol, 4 wt. % Discole ® N-518 (a surface active agent available from DKS International, Inc.), wt. % of a desizing agent, and 86.75 wt. % water.

COMPARATIVE EXAMPLE 14

An ink composition is prepared as in Example 13, except that no desizing agent is added.

RESULTS

The effects of the desizing agents on the Hercules sizing values are measured on diazo paper treated with a 1% solution for desizing agents in an aqueous medium. The Hercules sizing values for the ink compositions and the drying times of the ink compositions are measured. The results are reported in the following Table.

The Hercules sizing values of the untreated and treated papers are measured on a Hercules Sizing Tester (Hercules Incorporated) as described in TAPPI standard T-530 PM-83 issued by the Technical Association of the Pulp and Paper Industry. This method is closely related to the widely used ink flotation test. The TAPPI method has the advantage over the ink flotation test of detecting the end-point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined percentage (80%) of its original reflectance.

Drying times on Xerox 4024 ® acidic sized paper (Champion Courtland paper), and on Sanyo L ® available from Sanyo, are measured. The drying times are determined by measuring the time needed for the ink to absorb into the paper upon printing a solid area. A cotton swab is used to smear the printed image at different time intervals. The drying time is defined as the time at which no smearing is detected. The sizing values are also determined using each different ink composition on the Xerox 4024 ®paper and the Sanyo L ® paper.

In the absence of desizing agents, the comparative inks dry in many seconds, e.g., Example 14 is more than 10 seconds on 4024 paper and Example 2 in about 8 seconds on 4024 paper. The addition of the desizing agents lowers the drying times significantly. Further, the relative sizing values clearly indicate a correlation with drying times of the inks. Propylene carbonate is a very efficient penetrant for the Sanyo L ® paper, but not for the Xerox 4024 ® paper.

Example 13 shows that the desizing agent is effective in the absence of propylene carbonate.

| Example | Desizing Agent | Hercules Sizing Value S (sec)[1] | Sizing Values[2] (sec) ON 4024 | Sizing Values[2] (sec) ON Sanyo L | Drying Times (sec) ON 4024 | Drying Times (sec) ON Sanyo L |
| --- | --- | --- | --- | --- | --- | --- |
| 1 (control) | none | 1100.0 | — | — | — | — |
| 2 (control) | — | — | 104.4 | 0.4 | 8 | — |
| 3 | Alkasurf LA-EP-15 | 0.4 | 0.6 | 0.6 | <1 | ~1 |
| 4 | Alkasurf LA-EP-25 | 1.5 | 0.6 | 0.4 | <1 | ~1 |
| 5 | Alkasurf LA-EP-65 | 5.0 | 0.8 | 0.5 | <1 | ~1 |
| 6 | Alkasurf O-14 | 4.5 | 2.6 | 0.6 | <1 | ~1 |
| 7 | Alkasurf NP-11 | 5.0 | 1.0 | 0.5 | <1 | ~1 |
| 8 | Alkasil NEP 73-70 | 4.0 | 2.9 | 0.8 | <1 | ~1 |
| 9 | Alkamide 2104 | — | 0.7 | 0.7 | <1 | 6 |
| 10 | Alkasurf CO-25B | 9.0 | 2.6 | 0.6 | <1 | 2 |
| 11 | Alkasurf OP-12 | 4.0 | 1.1 | 0.4 | <1 | ~1 |
| 12 | Alkateric 2 C1B | 54.5 | 13.2 | 0.7 | <1 | 6 |
| 13 | Alkasurf LA-EP-15 | — | 0.9 | 0.8 | — | — |
| 14 (control) | — | — | 141.6 | 386.0 | >10 | >10 |

[1]Hercules sizing values of diazo paper. Example 1 (untreated paper); Examples 3–13 (paper treated with a 1% solution of desizing agents in aqueous medium. Tappi Standard Test).
[2]Sizing values determined with specific ink compositions in Examples 2–14. Other test conditions are kept identical to Tappi Standard Test.

While the invention has been described with particular reference to preferred embodiments, the invention is not intended to be limited to the specific examples given, and other embodiments and modifications can be made by those skilled in the art without departing from the spirit and scope of the invention.

What is claimed is:

1. An ink composition comprising a colorant, an ink vehicle and a desizing agent wherein said desizing agent is selected from the group consisting of (1) poly(oxyalkylene) modified compounds of sorbitan esters, alkanol amides, castor oil, or fatty acids; (2) hydrophilic poly(dialkyl-siloxanes); (3) fatty imidazolines; (4) fatty ester modified compounds of sorbitan, glycerol, poly(ethylene glycol), sulfonic acid, or alkyl amine; (5) quaternary alkosulfate compounds; and (6) poly(alkylene glycols).

2. The ink composition of claim 1, comprising less than 2 wt. % of said desizing agent.

3. The ink composition of claim 1, said composition having a Hercules sizing value on diazo paper of less than about 6.

4. The ink composition of claim 1, wherein said poly(oxyalkylene) modified compounds are selected from the group consisting of
   (a) poly(oxyethylene) sorbitan mono-laurate, poly(oxyethylene) sorbitan-mono oleate, poly(oxyethylene) sorbitan tri-oleate;
   (b) castor oil ethoxylates;
   (c) cocoalkanolamide ethoxylates; and
   (d) oleic acid ethoxylates, lauric acid ethoxylates, palmitic acid ethoxylates.

5. The ink composition of claim 1, wherein said hydrophilic poly(dialkyl siloxanes) are selected from the group consisting of
   (a) carbinol terminated poly(dimethyl siloxanes) selected from poly(ethylene oxide)-b-poly(dimethyl siloxane) diblock copolymers and poly(ethylene oxide)-b-poly(dimethyl siloxane)-b-poly(ethylene oxide) triblock copolymers;
   (b) poly(dimethyl siloxane)-b-poly(ethylene oxide)-b-poly(propylene oxide) triblock copolymers;
   (c) poly(dimethyl siloxane)-b-(methyl siloxane alkylene oxide) diblock copolymers where alkylene is ethylene, propylene or ethylene-propylene; and
   (d) poly quaternary poly(dimethyl siloxane).

6. The ink composition of claim 1, said fatty imidazolines are selected from the group consisting of
   (a) coco hydroxyethyl imidazoline;
   (b) oleic hydroxyethyl imidazoline;
   (c) tall oil amino ethyl imidazoline; and
   (d) sodium carboxylic imidazoline.

7. The ink composition of claim 1, wherein said fatty ester modified compounds are selected from the group consisting of:
   (a) sorbitan mono laurate, sorbitan mono oleate and sorbitan trioleate;
   (b) glyceryl mono oleate, glyceryl dioleate, glyceryl trioleate;
   (c) poly(ethylene glycol) mono oleate, poly(ethylene glycol) mono laurate, poly(ethylene glycol) dioleate, poly(ethylene glycol) di-laurate, poly(ethylene glycol) di-tallow;
   (d) isopropylamine dodecyl benzene sulfonate, calcium dodecyl benzene sulfonate; and
   (e) coco diethanol amide, lauric diethanol amide, coco monoethanol amide, lauric monoethanol amide, lauric mono isopropyl amide, and soya diethanol amide.

8. The ink composition of claim 1 wherein said quaternary alkosulfate compounds are selected from the group consisting of
   (a) nonpolymeric quaternary ammonium ethosulfate;
   (b) quaternary dialkyl dimethyl methosulfate;
   (c) quaternary alkoxylated di-tallow methosulfate;
   (d) quaternized tallow imidazoline methosulfate; and
   (e) quaternized oleic imidazoline methosulfate.

9. The ink composition of claim 1, wherein said poly glycol) is selected from the group consisting of poly(propylene glycol), poly(propylene glycol dimethacrylate), poly(ethylene glycol monomethyl-ether), poly(ethylene glycol diglycidyl ether), poly(ethylene glycol dimethyl ether), and poly(1,4-oxybutylene glycol).

10. The ink composition according to claim 1, further comprising a penetrant.

11. The ink composition according to claim 10, wherein said penetrant is propylene carbonate.

12. An ink composition comprising a colorant, an ink vehicle and 0.1 to 5% by weight of a poly(propylene oxide)-poly(ethylene oxide) copolymer selected from the group consisting of
   (a) poly(propylene oxide)-b-poly(ethylene oxide)-b-poly(propylene oxide) triblock copolymers; and
   (b) tetrafunctional block copolymers derived from the sequential addition of ethylene oxide and propylene oxide to ethylene diamine.

13. An ink composition, comprising a colorant, an ink vehicle and 0.1 to 5% by weight of a desizing agent selected from the group consisting of lauryl alcohol ethoxylates, oleyl alcohol ethoxylates, tallow alcohol ethoxylates, nonyl phenol ethoxylate, octyl phenol ethoxylate, oleic acid ethoxylates, dicarboxylic cocoimidazoline sodium salts and diethanol amide of coconut fatty acids.

14. The ink composition of claim 13, said composition having a pH of about 5 to about 10.

15. The ink composition of claim 13, comprising 0.1 to 2 wt. % of said desizing agent.

16. The ink composition of claim 13, said composition having a Hercules sizing value on diazo paper of less than about 6.

17. The ink composition of claim 13, wherein said desizing agent is nonyl phenol ethoxylate.

18. The ink composition according to claim 13, wherein said ink vehicle comprises water and said colorant comprises dye.

19. The ink composition of claim 13, wherein said desizing agent is selected from the group consisting of lauryl alcohol ethoxylates, oleyl alcohol ethoxylates, tallow alcohol ethoxylates, nonyl phenol ethoxylate, and octyl phenol ethoxylate.

20. The ink composition of claim 17, wherein said desizing agent is present in an amount ranging from about 0.5% to about 2.0% by weight based on weight of the total composition.

21. The ink composition of claim 17, wherein said colorant is a dye.

22. The ink composition of claim 17, wherein said ink vehicle comprises water and a cosolvent.

23. A method of ink jet printing, comprising jetting ink onto a substrate, the ink comprising a colorant, an ink vehicle, a penetrant and 0.1 to 5% by weight of a water or alcohol soluble desizing agent, said ink having a pH of about 5 to about 10.

24. The method of claim 23, wherein said desizing agent is present in an amount between about 0.1 to 2 wt. %.

25. The method according to claim 23, wherein said penetrant is propylene carbonate.

26. The method of claim 23, said composition having a Hercules sizing value on diazo paper of less than about 6.

27. The method of claim 23, wherein said desizing agent is nonyl phenol ethoxylate.

28. A method of ink jet printing, comprising jetting the ink composition of claim 1 onto a substrate.

29. A method of ink jet printing, comprising jetting the ink composition of claim 12 onto a substrate.

30. A method of ink jet printing, comprising jetting the ink composition of claim 13 onto a substrate.

31. A method of ink jet printing, comprising jetting the ink composition of claim 17 onto a substrate.

* * * * *